United States Patent
Asai et al.

(10) Patent No.: US 10,746,926 B2
(45) Date of Patent: Aug. 18, 2020

(54) OPTICAL WAVEGUIDE SUBSTRATE (71) Applicant: NGK INSULATORS, LTD., Nagoya, Aichi-prefecture (JP)

(72) Inventors: Keiichiro Asai, Nagoya (JP); Shoichiro Yamaguchi, Ichinomiya (JP)

(73) Assignee: NGK INSULATORS, LTD., Nagoya, Aichi (JP)

( * ) Notice: Subject to any disclaimer, the term of this patent is extended or adjusted under 35 U.S.C. 154(b) by 0 days.

(21) Appl. No.: 15/958,367

(22) Filed: Apr. 20, 2018

(65) Prior Publication Data
US 2018/0239090 A1 Aug. 23, 2018

Related U.S. Application Data (63) Continuation of application No. PCT/JP2016/074175, filed on Aug. 19, 2016.

(30) Foreign Application Priority Data

Oct. 22, 2015 (JP) .................. 2015-207969

(51) Int. Cl.
*G02B 6/136* (2006.01)
*G02B 6/132* (2006.01)
*G02B 6/122* (2006.01)
*G02B 6/12* (2006.01)

(52) U.S. Cl.
CPC ............ *G02B 6/136* (2013.01); *G02B 6/122* (2013.01); *G02B 6/132* (2013.01); *G02B 2006/12097* (2013.01)

(58) Field of Classification Search
None
See application file for complete search history.

(56) References Cited

U.S. PATENT DOCUMENTS

| 6,465,810 | B1 * | 10/2002 | Tamada | ................ H01S 5/1082 |
| | | | | 257/94 |
| 2013/0234193 | A1 * | 9/2013 | Odnoblyudov | ..... H01L 33/0095 |
| | | | | 257/99 |
| 2014/0131578 | A1 * | 5/2014 | Hruska | ................ G01N 21/359 |
| | | | | 250/339.02 |

(Continued)

FOREIGN PATENT DOCUMENTS

| JP | 05-029298 A | 2/1993 |
| JP | 05-045514 A | 2/1993 |
| JP | 2000-012954 A | 1/2000 |

(Continued)

OTHER PUBLICATIONS

International Preliminary Report on Patentability for PCT/JP2016/074175, dated Apr. 24, 2018 (1 pg.).

(Continued)

*Primary Examiner* — Charles D Garber
*Assistant Examiner* — Xiaoming Liu
(74) *Attorney, Agent, or Firm* — Flynn Thiel, P.C.

(57) ABSTRACT

An optical waveguide substrate 1 includes an optical waveguide 9 composed of a multi-layered film 4 of a plurality of optical material films 5, 6 and having end faces onto which a light is made incident or from which the light is emitted. The end face is an etched surface, and it is provided, on the end face, an unevenness 7 corresponding to a difference of etching rates of the optical material films.

13 Claims, 10 Drawing Sheets

(56) References Cited

U.S. PATENT DOCUMENTS

2014/0170335 A1* 6/2014 Shao ................. C23C 16/042
427/569

FOREIGN PATENT DOCUMENTS

JP      2004-349636 A    12/2004
JP      2010-079041 A     4/2010

OTHER PUBLICATIONS

English translation of Written Opinion of the International Searching Authority for PCT/JP2016/074175, dated Nov. 8, 2016 (5 pgs.).
Optical Integrated circuits, by Nishihara et al, (revised edition), Ohmsha, Ltd., p. 180.
Estimation of Propagation Losses for Narrow Strip and Rib Waveguides, by S. Lindecrantz et al, IEEE Photonics Technology Letters, vol. 26, No. 18, 2014, pp. 1836-1839.

* cited by examiner

OPTICAL WAVEGUIDE SUBSTRATE

CROSS-REFERENCE TO RELATED APPLICATIONS

This is a continuation of International Application No. PCT/JP2016/074175, filed Aug. 19, 2016, which claims the priority of Japanese Patent Application No. 2015-207969, filed Oct. 22, 2015, the entire contents of which are incorporated herein by reference.

FIELD OF THE INVENTION

The present invention relates to an optical waveguide substrate including a channel type optical waveguide or the like.

BACKGROUND ARTS

In preparing optical integrated circuits, for realizing miniaturization and higher integration, it is effective to use a material having a high refractive index for a core of an optical waveguide. Particularly, as $Ta_2O_5$ is a material having a high refractive index and transparency, it is possible to form an optical waveguide of a low loss (non-patent document 1). Further, it was further studied to find a shape for preventing substantial loss by adjusting the structure of the waveguide (non-patent document 2). If a waveguide made of $Ta_2O_5$ and of a low loss is realized, it becomes possible to make a size of an optical integrated circuit considerably smaller compared with that realized by using a silica-based optical waveguide. Further, if a circuit of a large integration is realized, it can be established to provide an optical integrated circuit of improved function.

CITATION LIST (Non-patent document 1) "Optical Integrated circuits" co-authored by Nishihara, Haruna and Kurusu (revised edition) page 180, Ohmsha, Ltd.
(Non-patent document 2) S. M. Lindecrantz, et. al. IEEE PHOTONICS TECHNOLOGY LETTERS, VOL. 26, No. 18, pp. 1836-1839, Sep. 15, 2014

SUMMARY OF THE INVENTION

As a refractive index of a core of an optical waveguide becomes higher, reflection at an end part of the waveguide becomes more considerable to reduce a transmission amount. For preventing the reflection at the end part of the waveguide, an anti-reflection coating is usually formed on the end part of the optical waveguide. Normally, the end part is subjected to polishing at its end face and the anti-reflection coating is formed on the end face. However, when it is tried to produce a complex optical integrated circuit, it is necessary to make end portions of a plurality of waveguides parallel with each other so that the end faces of the waveguides are aligned. This necessity restricts free designing of optical circuits. Further, in the case that the end portions of the optical waveguides are positioned so that a plurality of the end faces are not aligned parallel with each other, it is necessary to polish the end faces polygonally and to form anti-reflection coatings on the respective end faces. This requires troublesome processing steps.

An object of the present invention is, in an optical waveguide substrate including an optical waveguide composed of an optical material, to provide a structure for preventing reflection at an incident side or emitting side end face of the optical waveguide without the need of providing an anti-reflection coating on the end face.

The present invention provides an optical waveguide substrate comprising an optical waveguide, said optical waveguide comprising a multi-layered film comprising a plurality of optical material films, said optical waveguide further comprising an end face onto which a light is incident or from which said light is emitted;
wherein at least said end face comprises an etched surface; and
wherein said end face comprises an unevenness corresponding with a difference of etching rates of said optical material films.

The present invention further provides a method of producing an optical waveguide substrate; said method comprising the steps of:
providing an optical waveguide comprising a multi-layered film comprising a plurality of optical material films, said optical waveguide comprising an end face onto which alight is incident or from which said light is emitted; and
etching said end face to provide, on said end face, an unevenness reflecting a difference of etching rates of said optical material films.

The present inventors have studied to form an optical waveguide by a multi-layered film in which many optical material films are laminated. Then, it is necessary to form an anti-reflection coating at end faces of the multi-layered film as the reflection of light is observed. However, the inventors have tried to appropriately change the condition of forming the film during the formation of the multi-layered film and subject the end faces thereof to wet etching. As a result, it is found that an unevenness is formed on the end face of the multi-layered film due to a difference of etching rates of the optical material films forming the multi-layered film. It is then found that the unevenness functions as a kind of a Moth-Eye structure to prevent the reflection at the end faces, in the case that light is irradiated into the optical waveguide in which the unevenness is formed on the end face. The present invention is thus made.

BRIEF DESCRIPTION OF THE DRAWINGS

FIG. 5(a) is a plan view showing a surface of the supporting body 2,
FIG. 5(b) is a side view showing the supporting body 2, and FIG. 5 (c) shows the state that a clad layer 3 is provided on the supporting body 2.
FIG. 7 (a) is a plan view showing the state that a mask 16 is provided on a multi-layered film 14, and FIG. 7 (b) is a side view showing the state that the mask 16 is provided on the multi-layered film 14.

EMBODIMENTS FOR CARRYING OUT THE INVENTION

Figure 1:
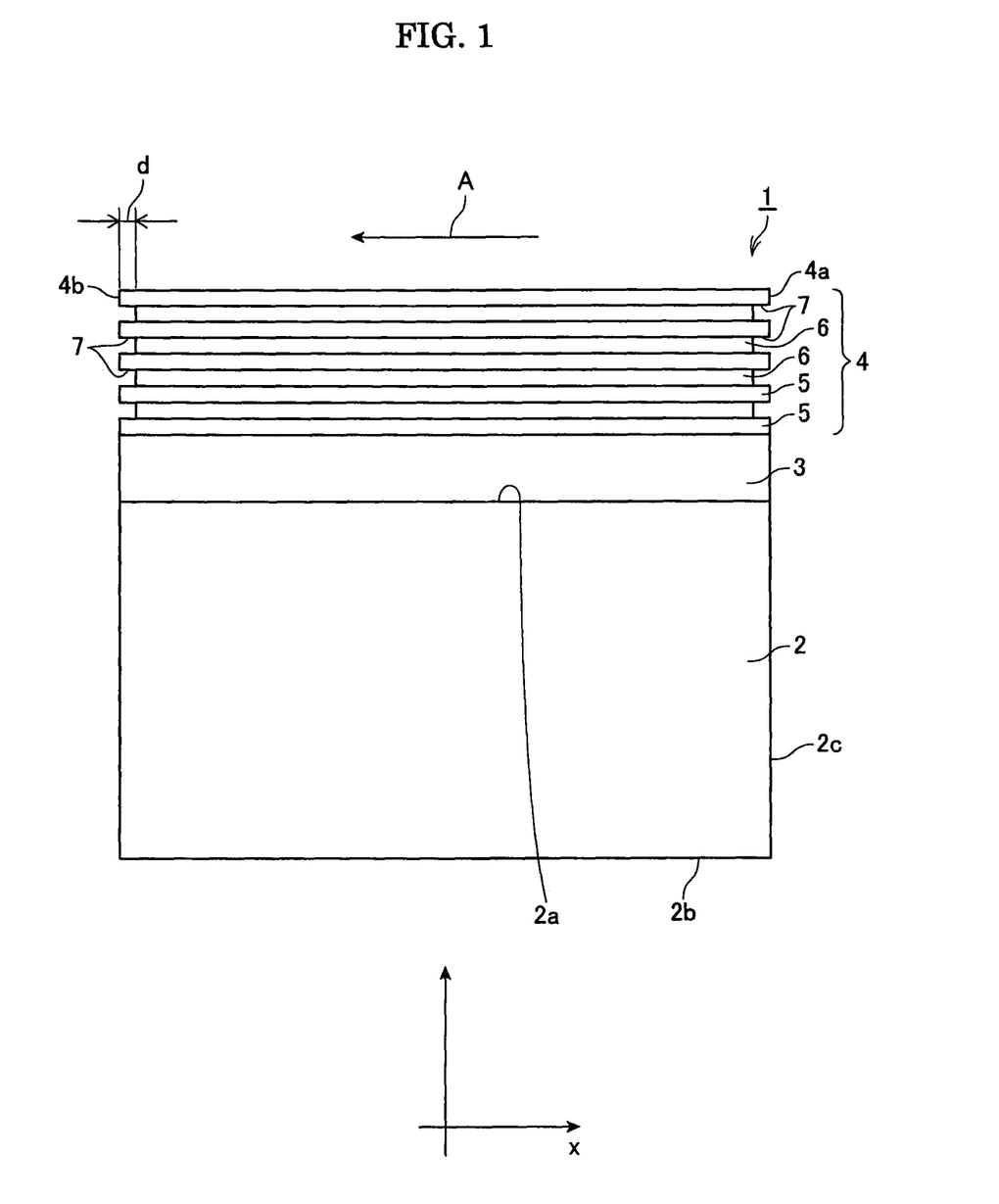
FIG. 1 is a side view schematically showing an optical waveguide substrate 1 of an embodiment of the present invention.
Figure 2:
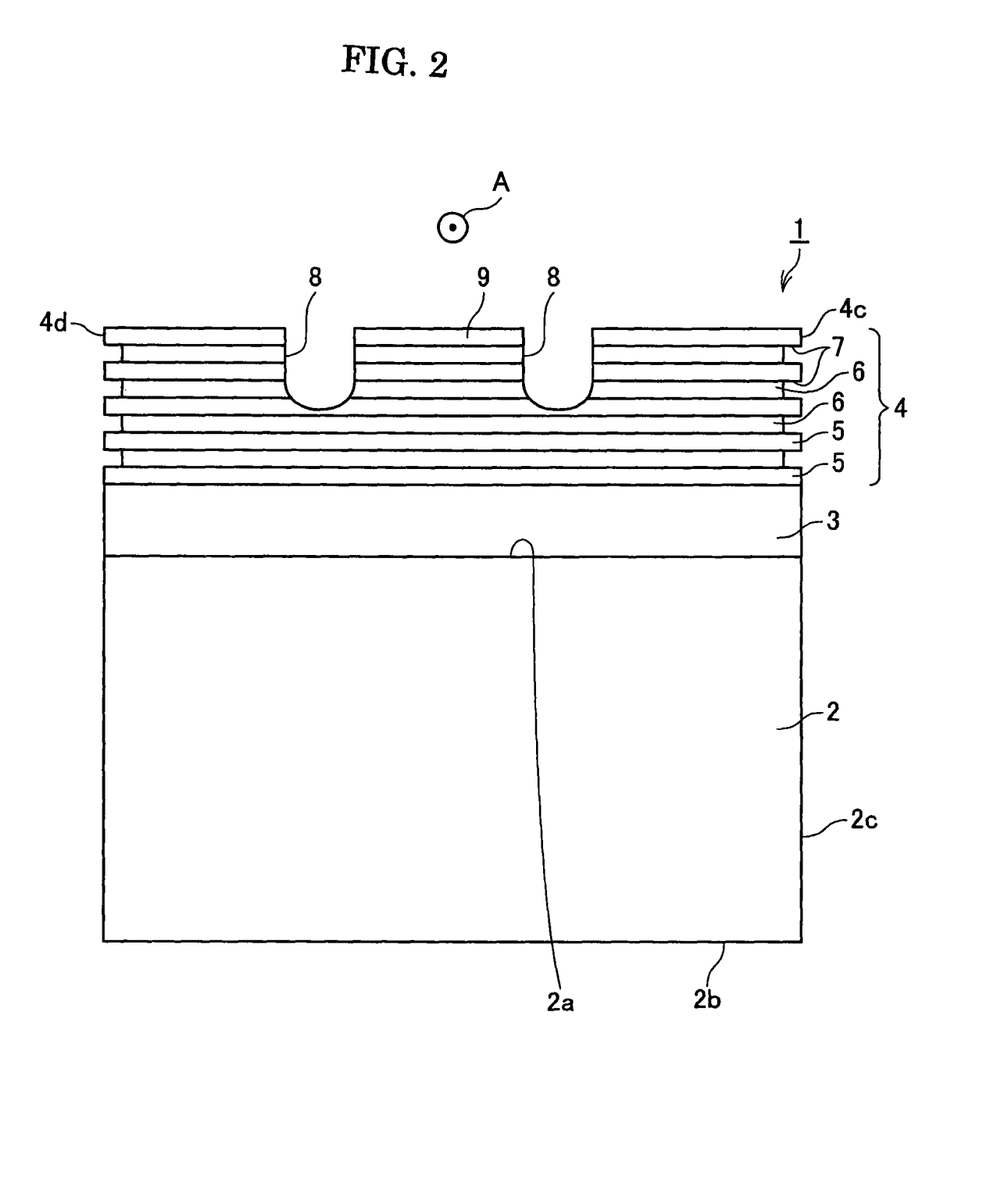
FIG. 2 is a front view schematically showing the optical waveguide substrate 1 of FIG. 1.
Figure 3:
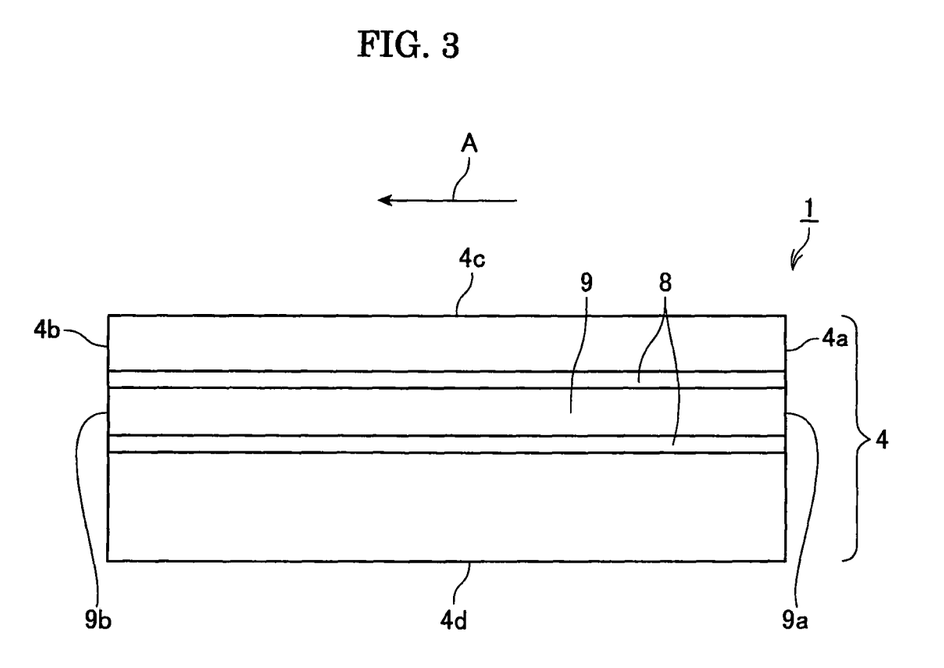
FIG. 3 is a plan view schematically showing the optical waveguide substrate 1 of FIG. 1.

According to an example of FIGS. 1 to 3, multi-layered film 4 is provided over an upper face 2a of a supporting body 2 through a clad layer 3. 2c represents a side face and 2b represents a bottom face of the supporting body 2. The multi-layered film 4 is formed by alternately laminating optical material films 5 and 6 whose production conditions are different from each other. End faces 4a, 4b, 4c and 4d of the multi-layered film 4 are etched faces, in which unevenness 7 is provided corresponding to a difference of etching rates of the optical material layers. Specifically, the etching rate of the optical material film 6 is relatively higher, and the etching rate of the optical material film 7 is relatively lower. "d" represents a step height of the unevenness 7.

As shown in FIGS. 2 and 3, for example, a pair of ridge grooves 8 are formed in the optical material layer 4, and a ridge type optical waveguide 9 is formed between the ridge grooves 8. Light is made incident into the optical waveguide 9 through an end face 9a on the incident side, propagates in the optical waveguide 9 as an arrow A and emits from an end face 9b on the emitting side. As each of the end faces 9a and 9b constitutes a part of the end face 4a or 4b, there is provided an unevenness 7 corresponding to the difference of etching rates of the optical material films 5 and 6.

Figure 4:
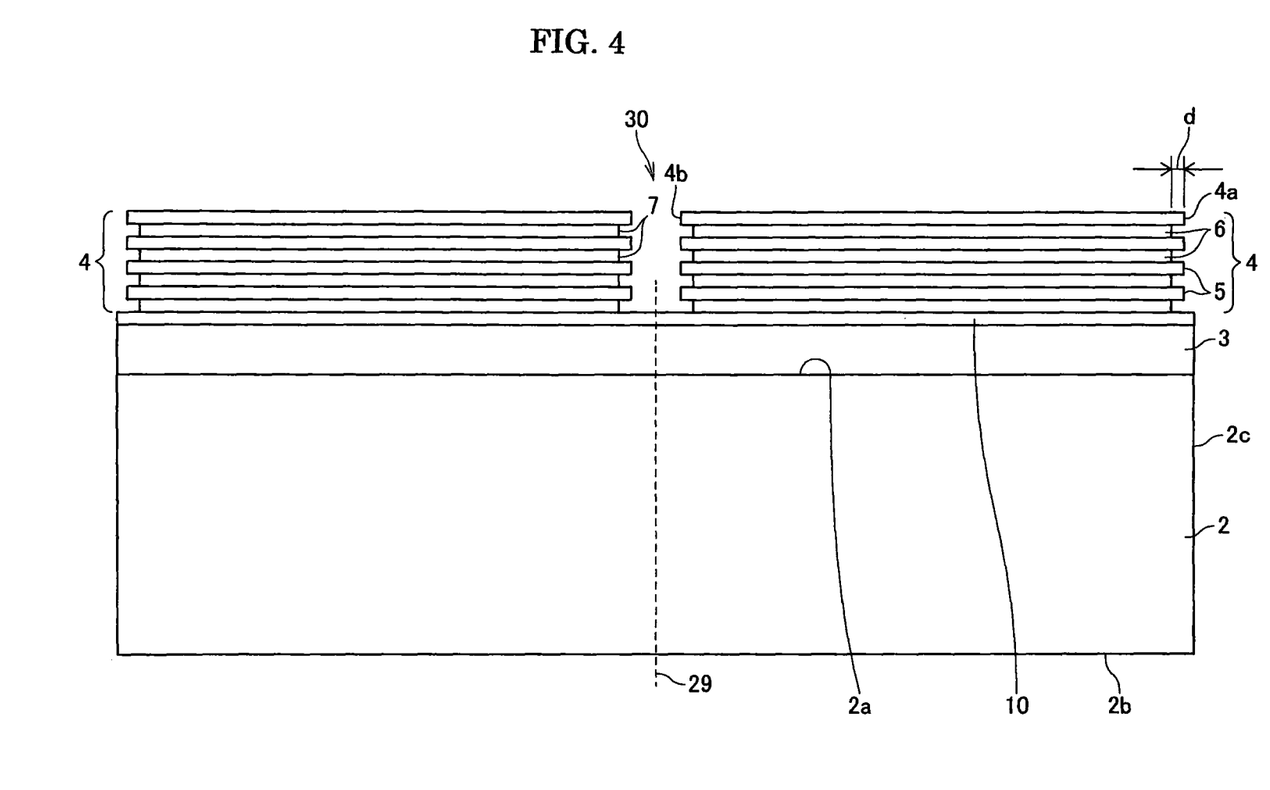
FIG. 4 is a side view schematically showing the state that a plurality of optical waveguides are formed on a supporting body 2.

An example of FIG. 4 shows a plurality of multi-layered films 4 formed on an upper face 2a of a supporting body 2. Although the number of the multi-layered films 4 is two in FIG. 4, the number of the multi-layered films may be appropriately selected as a matter of course.

A clad layer 3 is provided on the upper face 2a of the supporting body 2, and a plurality of the multi-layered films 4 are provided over the clad layer 3 through a protective film 10. In the case that the clad layer 3 is made of a material susceptible to etching during a wet etching process, it is preferred to provide the protective film 10 thereon to avoid the etching of the clad layer 3.

Each of the multi-layered films 4 is formed by alternately laminating the optical material layers 5 and 6 whose production conditions are different from each other. Each of the end faces 4a and 4b of each multi-layered film 4 is composed of an etched surface, in which it is provided an unevenness corresponding to the difference of the etching rates of the optical material layers 5 and 6. Specifically, the etching rate of the optical material layer 6 is relatively high and the etching rate of the optical material layer 5 is relatively low. "d" represents a height of the unevenness 7. A space 30 is provided between the adjacent multi-layered films 4. Although each of the multi-layered films 4 may be used as a slab-type optical waveguide, it is preferred to form a channel type optical waveguide as shown in FIGS. 2 and 3.

Then, the supporting body 2 and clad layer 3 are cut along the space 30 of the adjacent multi-layered films 4 as dotted lines 29 to separate the respective devices.

It will be then described a preferred process of producing an optical waveguide substrate.

Figure 5:
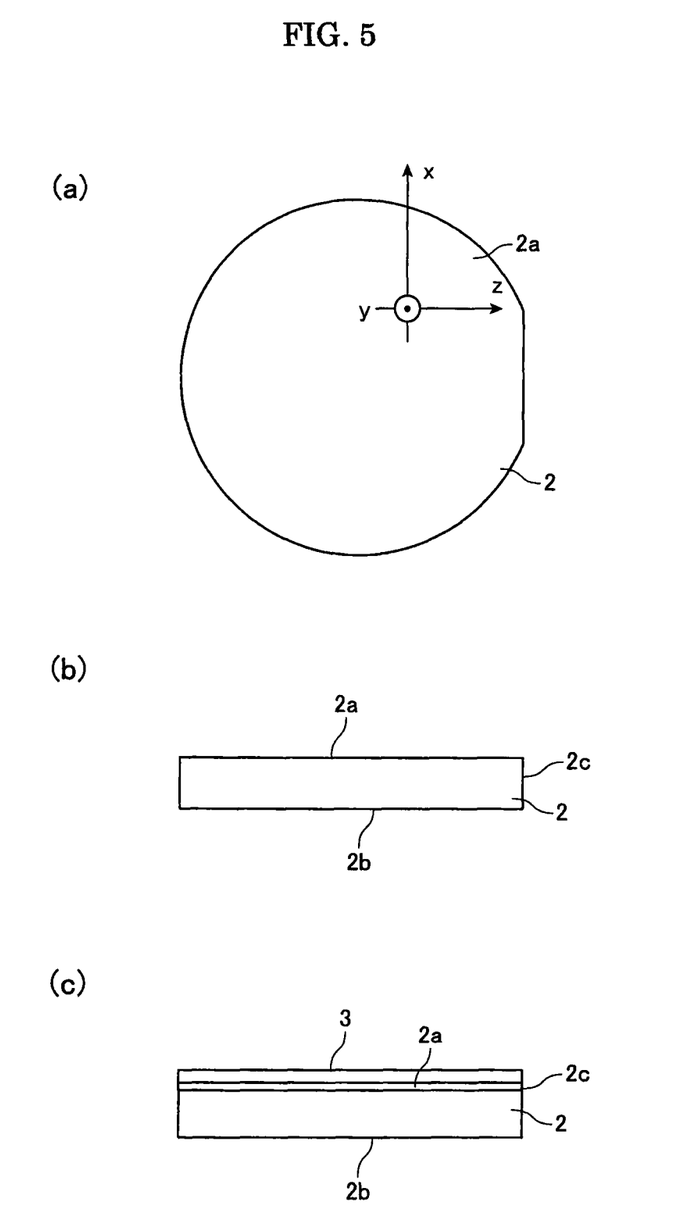

As shown in FIGS. 5(a) and 5(b), it is prepared a supporting body 2. Specific material of the supporting body is not particularly limited and includes lithium niobate, lithium tantalate, AlN, SiC, ZnO, a glass such as quartz glass, synthetic quartz, quartz crystal, Si and the like.

The thickness of the supporting body may preferably be 250 µm or larger from the viewpoint of handling and 1 mm or smaller from the viewpoint of reduction of the size.

Then, as shown in FIG. 5(c), the clad layer 3 is formed on the supporting body 2. In the case that the clad layer is provided, the leakage of the propagating light into the supporting body can be reduced by thickening the clad layer. From this viewpoint, the thickness of the clad layer may preferably be 0.5 µm or larger.

Further, an upper clad layer may be additionally provided on the multi-layered film of the optical waveguide substrate. Such clad layer and upper clad layer are made of a material whose refractive index is lower than that of the multi-layered film. The layers may be formed of silicon oxide, tantalum oxide or zinc oxide, for example. Further, the clad layer or upper clad layer may be doped to adjust the refractive index. Such a dopant includes P, B, Al and Ga.

Figure 6:
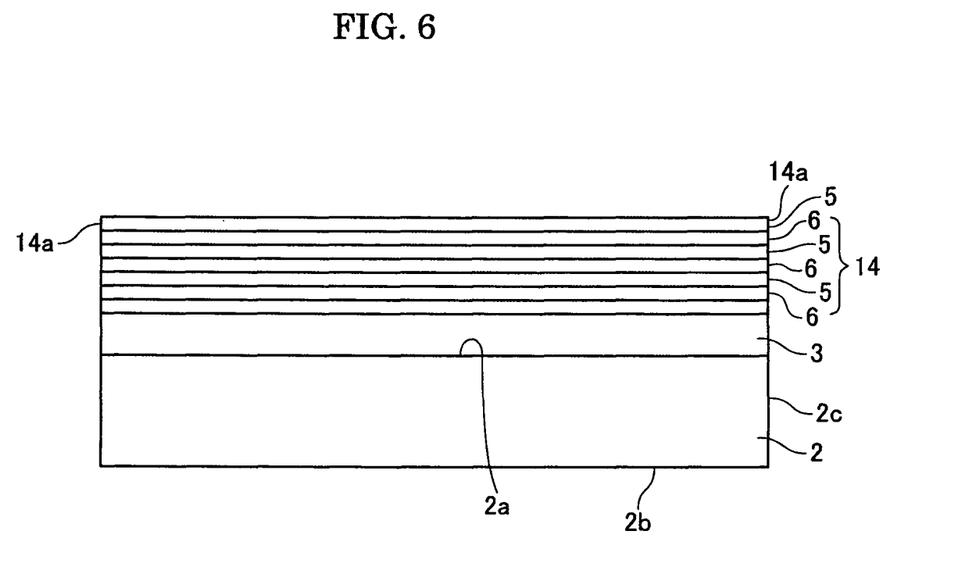
FIG. 6 is a side view showing the state that a multi-layered film is formed on the clad layer 3.

Then, as shown in FIG. 6, the multi-layered film 14 is formed over the clad layer 3. The multi-layered film 14 is composed of a plurality of the optical material layers 5 and 6. 14a and 14b represent the respective end faces.

As a method of forming the multi-layered film, CVD, sputtering and ion assisted vapor deposition processes are listed, and ion assisted vapor deposition is preferred from the viewpoint of controllability of the etching rates.

Optical materials for forming the multi-layered film may be selected from optical materials including zinc oxide, tantalum oxide, lithium niobate, lithium tantalate, titanium oxide, aluminum oxide, niobium pentoxide, magnesium oxide and the like. Further, the refractive index of the optical material layer may preferably be 1.7 or higher and more preferably be 2 or higher.

A rare earth element may be contained in the optical material forming the multi-layered film. The rare earth element may preferably be Nd, Er, Tm, Ho, Dy or Pr.

Although the whole thickness of the multi-layered film is not particularly limited, it may be 0.5 to 3 µm from the viewpoint of reducing the propagation loss of the light.

Here, by changing the production conditions of the respective optical material films forming the multi-layered film, the etching rates of the respective optical material films can be made different from each other in the step of etching the end face.

Specifically, the production conditions are changed as follows to control the etching rates of the respective optical material films. Specifically, the beam current and beam voltage of an ion source during the ion assisted vapor deposition is changed to control the etching rates. As the beam current and beam voltage are higher, the etching rate becomes lower.

For example, in the case of $Ta_2O_5$, the etching rate of the optical material film 5 is about 0.7 nm/sec and the etching rate of the optical material film 6 is about 13 nm/sec. As the measuring method, it is calculated based on the dimensions of the device before and after the etching and observation of the cross section by SEM after cleavage.

The step height "d" of the unevenness on the end face of the multi-layered film is appropriately designed based on the target reflection characteristics. For example, for lowering the reflectivity with respect to light having a wavelength of 400 to 800 nm, "d" may preferably be 20 nm or larger and more preferably be 100 nm or larger. Further, "d" may preferably be 800 nm or smaller and more preferably be 400 nm or smaller.

Although the multi-layered film may be used as a slab type optical waveguide, a channel type optical waveguide is preferably formed in the multi-layered film. The channel type optical waveguide is not limited to a ridge type optical waveguide and may be a proton exchange type or metal diffusion type optical waveguide.

Figure 7:
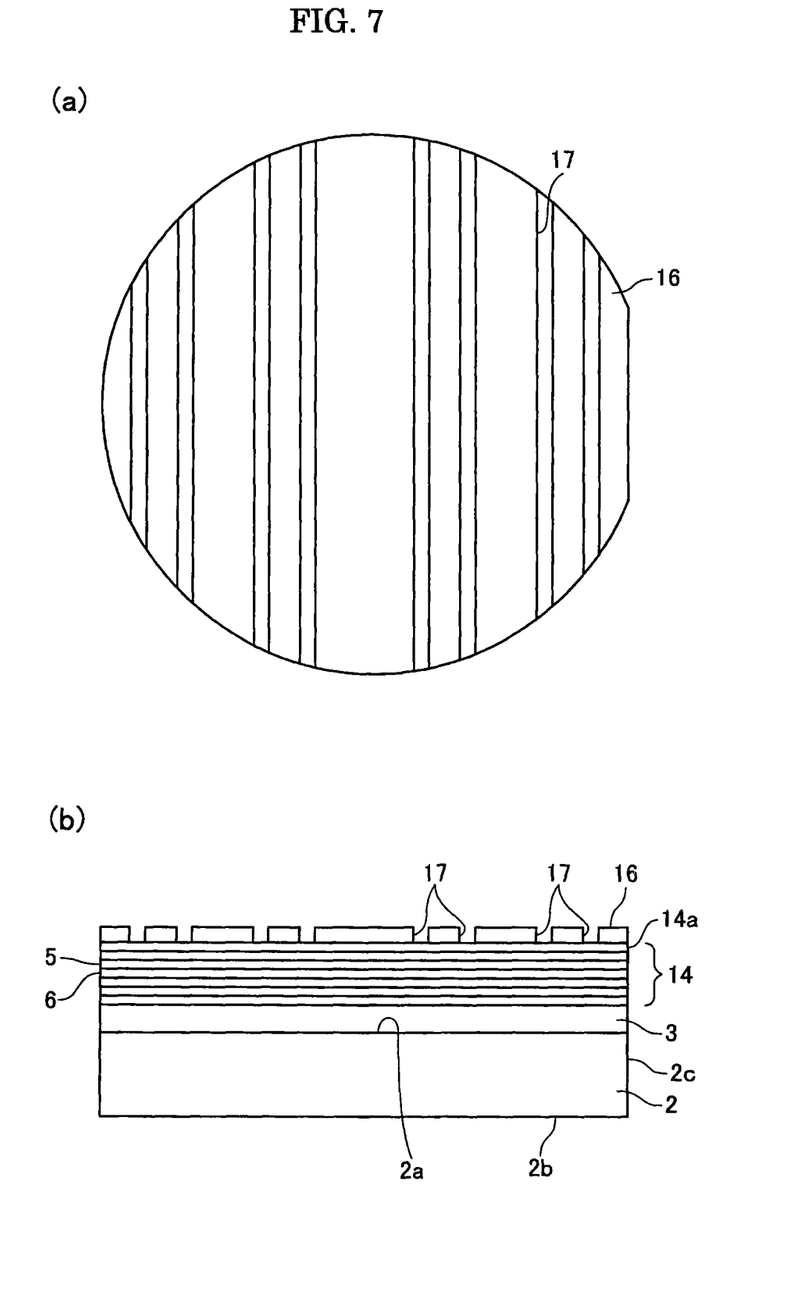

For examples, as shown in FIGS. 7(a) and 7(b), there is formed a mask material layer for forming an optical waveguide on the multi-layered film 14. Then, the mask material layer is patterned to obtain a mask 16 for forming a ridge type optical waveguide. Openings 17 for forming ridge grooves are formed at predetermined positions in the mask 16.

The surface of the multi-layered film 14 is then etched to form the ridge grooves in a multi-layered film 18 as shown in FIGS. 8(a) and 8(b). The ridge type optical waveguide 9 is formed between a pair of the ridge grooves.

As the material of the mask material layer, Cr, Ni, Ti, Al, tungsten silicide and the like or the multi-layered film thereof are listed.

Further, as the method of etching the mask material layer or multi-layered film, dry etching and wet etching are listed.

The dry etching includes reactive ion etching or the like, for example, and a gas specie includes fluorine-based or chlorine-based gas species.

The wet etching includes fluoric acid or TMAH-based wet etching are listed, for example.

Figure 8:
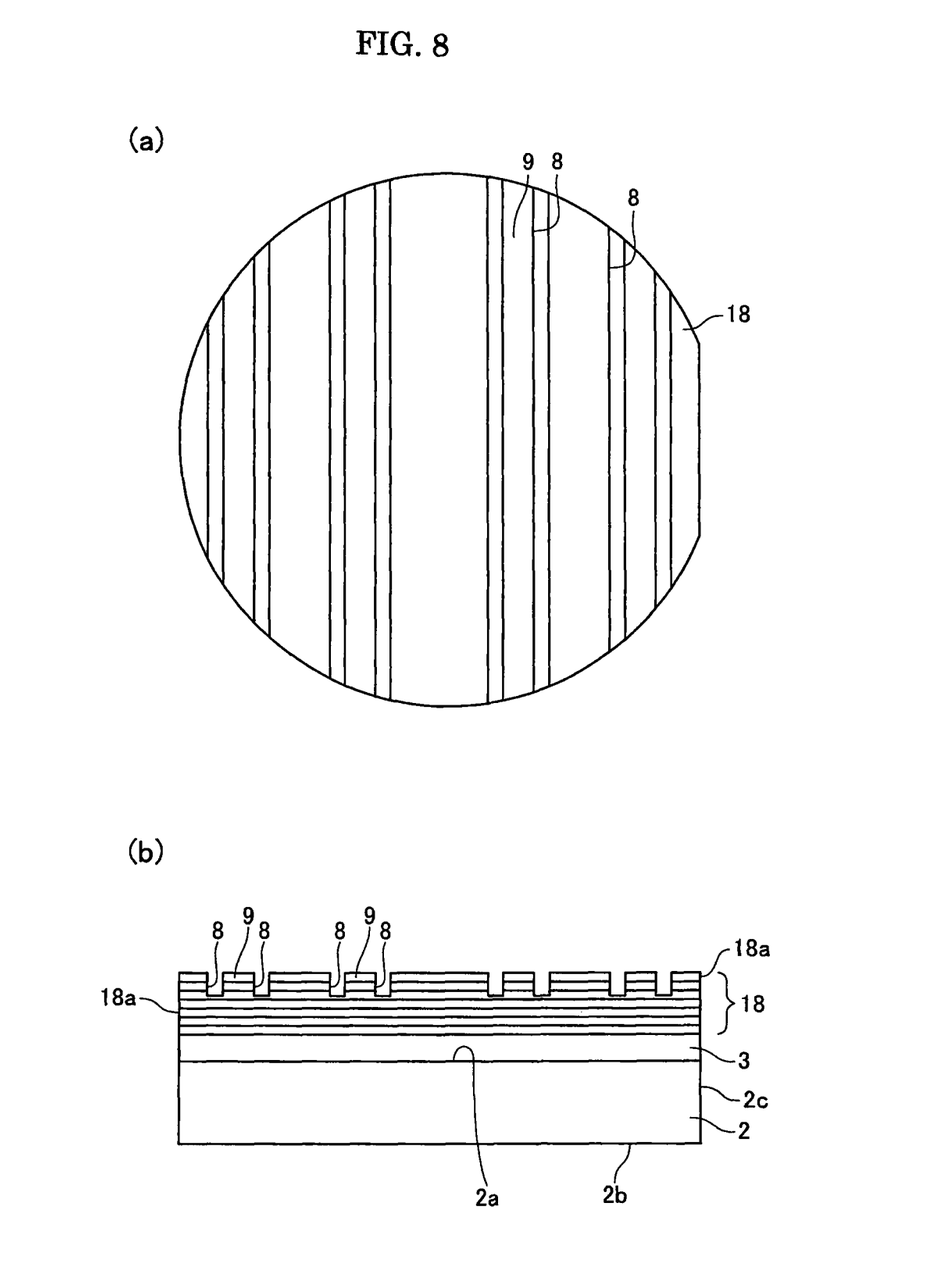
FIG. 8(a) is a plan view showing the state that a ridge-type optical waveguide 9 is formed on a multi-layered film 18.
FIG. 8(b) is a side view showing the state that the ridge-type optical waveguide 9 is formed.

In the state shown in FIG. 8, a predetermined number of chips for optical waveguide substrates are formed on one supporting body 2. Then, the supporting body is cut into the respective chips each having a shape shown in FIGS. 1 to 3. Each chip is then subjected to etching treatment so that the end face 18a of each multi-layered film 18 is subjected to the etching treatment to form the unevenness 7.

As such etching treatment, appropriate etching method or applied gas or agent may be appropriately selected depending on the respective materials. For example, it is preferred wet etching using fluoric acid. In the case of $Ta_2O_5$, it is particularly preferred wet etching using fluoric acid.

However, in the case that many chips for optical waveguide substrates are formed on the supporting body, if the end faces of the chips are subjected to the etching treatment after cutting into the chips, the step of the etching treatment becomes troublesome. Thus, preferably, the supporting body with many chips for optical waveguide substrates is not cut and grooves are formed at predetermined positions of the multi-layered film, only the multi-layered film is divided into chip units, and end faces of the respective multi-layered films are etched in the state that the end faces are exposed to the grooves. In this case, many chips for optical waveguide substrates can be subjected to the etching treatment at the same time without cutting them, so that the productivity can be improved.

For example, after the ridge grooves 8 are formed in the multi-layered film, as shown in FIGS. 9(a) and 9(b), grooves 30 are formed on the side of the upper face 20a of the multi-layered film 20. However, each groove 30 is formed so that it extends in a direction perpendicular to the ridge groove. Further, the locations and dimensions of the grooves 30 are adjusted to the sizes of the chips which are finally produced. The adjoining grooves (spacings) shown in FIG. 4 are thereby formed, so that the adjacent multi-layered films are divided by the grooves.

The end face of each multi-layered film 20 is subjected to etching at this stage, so that the unevenness can be formed corresponding to the difference of the etching rates of the optical material film on each end face. The supporting body and clad layer are cut along dotted lines 29 shown in FIG. 4, for example, along each groove to obtain each chip.

Further, in the case that the supporting body 2 and clad layer 3 are made of a material, such as silica, which is susceptible to etching, it is preferred that the exposed faces of the supporting body and clad layer are covered with a protective film made of a material having a low etching rate. For example, according to an example shown in FIG. 10, the bottom face 2b and end face 2c of the supporting body 2 and clad layer 3 are covered with a protective film 25.

As a material of such a protective film, aluminum oxide, tantalum oxide and the like can be listed, and aluminum oxide is preferred from the viewpoint of resistance against chemical liquids.

Further, as shown in FIG. 4, in the case that a plurality of the multi-layered films 4 are divided along the grooves 30 on the supporting body 2, it is preferred to prevent the etching of the supporting body 2 and clad layer 3 when the end faces of the respective multi-layered films 4 are etched. From this viewpoint, it is preferred to form an optical material layer 10 having a relatively low etching rate between the multi-layered film 4 and supporting body 2 (or clad layer 3).

EXAMPLES

Example 1

The optical waveguide substrate shown in FIGS. 1 to 3 was produced, according to the method described referring to FIGS. 5 to 8.

A y-cut substrate of $LiTaO_3$ was used as the supporting body 2. The clad layer 3 was then formed having a thickness of 0.4 μm made of alumina on the supporting body 2. The multi-layered film 14 was then formed by laminating the optical material layers 5 and 6 each made of $Ta_2O_5$ thereon. When the optical material layers 5 and 6 are formed, the ion assist conditions were alternately changed. Specifically, the optical material layer 5 was film-formed in 100 nm under a higher assist condition first, and the optical material layer 6 was then film-formed in 100 nm under a lower assist condition. The film-formation processes were alternately repeated 12 times. 100 nm of the optical material layer 5 was formed as the uppermost layer under the high assist condition to form the multi-layered film having a total thickness of 2.5 μm.

The ion assist conditions were as follows.
High assist condition: 1300 V and 1300 mA
Low assist condition: 500V and 500 mA Then, the ridge type optical waveguide was patterned by photolithography and the ridge grooves 8 were formed by dry etching (FIG. 8). Specifically, an aluminum film (thickness of 100 nm) was formed as the mask material film and the openings 17 for the ridge grooves were formed by photolithography. Thereafter, the ridge grooves 8 having a depth of 1.5 μm were formed in the multi-layered film 14 by fluorine-based dry etching to form the ridge type optical waveguide 9. The line width of the photomask was adjusted as that the width of the ridge portion was made 3 μm. During the subsequent etching step, the direction of the propagation of light in the waveguide was made identical with the x-axis of the crystal for preventing the etching of the underlying supporting body 2.

Then, the resulting body was cut into the respective chips of the optical waveguide substrates so that the length of each waveguide was made 10 mm, and the respective end faces of the chips were subjected to optical polishing.

The respective chips were subjected to wet etching for 13 seconds in fluoric acid (concentration of 50 percent) to form the unevenness on the respective end faces of the multi-layered films. The supporting body and clad layers were not etched. Further, as the respective end faces were observed, the optical material films 6 formed under the low assist condition were recessed 162 nm and the optical material films 5 formed under the high assist condition were recessed in 9 nm, so that the step height "d" between them was proved to be 153 nm.

Then, red laser light of a wavelength of 633 nm was condensed by a lens and made incident onto the end face of the ridge type optical waveguide. The coupling efficiency was evaluated and proved to be 70 percent.

Comparative Example 1

An optical waveguide substrate was produced as in Example 1. However, the step of etching the end faces of the multi-layered film by fluoric acid was not performed. The light having a wavelength of 633 nm was made incident onto the optical waveguide, and the coupling efficiency was evaluated and proved to be 63 percent.

Comparative Example 2

After the optical waveguide substrate of the comparative example 1 was produced, anti-reflection coatings were formed on the respective end faces of the optical waveguide. The light having a wavelength of 633 nm was made incident onto the optical waveguide, and the coupling efficiency was evaluated and proved to be 72 percent. As such, the optical waveguide structure of the present invention indicates an anti-reflection property comparable with the optical waveguide whose end faces are covered by the anti-reflection coatings.

Example 2

The optical waveguide substrate was produced according to the method described referring to FIGS. 5, 6, 7, 8, 9, 10 and 4.

As the supporting body 2, a y-cut substrate of LiTaO$_3$ was used. A clad layer 3 of a thickness of 0.4 μm and made of alumina was then formed on the supporting body 2, and the multi-layered film 14 was formed thereon in which the optical material films 5 and 6 are laminated. When the respective optical material films 5 and 6 were formed, the ion assist conditions were alternately changed. Specifically, the optical material film 5 was formed at 100 nm under the high assist condition first, and the optical material layer 6 was then formed at 100 nm under the low assist condition. The film-formation steps were alternately performed 12 times, and the optical material film 5 was finally formed at 100 nm under the high assist condition as the uppermost film. The multi-layered film having a total thickness of about 2.5 μm was thus produced.

The ion assist conditions were as follows.
High assist condition: 1300V and 1300 mA
Low assist condition: 500V and 500 mA The ridge type optical waveguide was then patterned by photolithography, and the ridge grooves were formed by dry etching (FIG. 8). Specifically, an aluminum film (thickness of 100 nm) was used as the mask material film, and the opening 17 for the ridge grooves were provided by photolithography. Thereafter, the ridge grooves 8 each having a depth of 1.5 μm were formed in the multi-layered film 14 by fluorine-based dry etching to form the ridge type optical waveguide 9. The line width of the photo mask was adjusted so that the ridge portion had a width of 3 μm. The propagation direction in the optical waveguide was made identical with the x-axis of the crystal, so that the underlying supporting body 2 was hard to be etched during the subsequent etching step.

Figure 9:
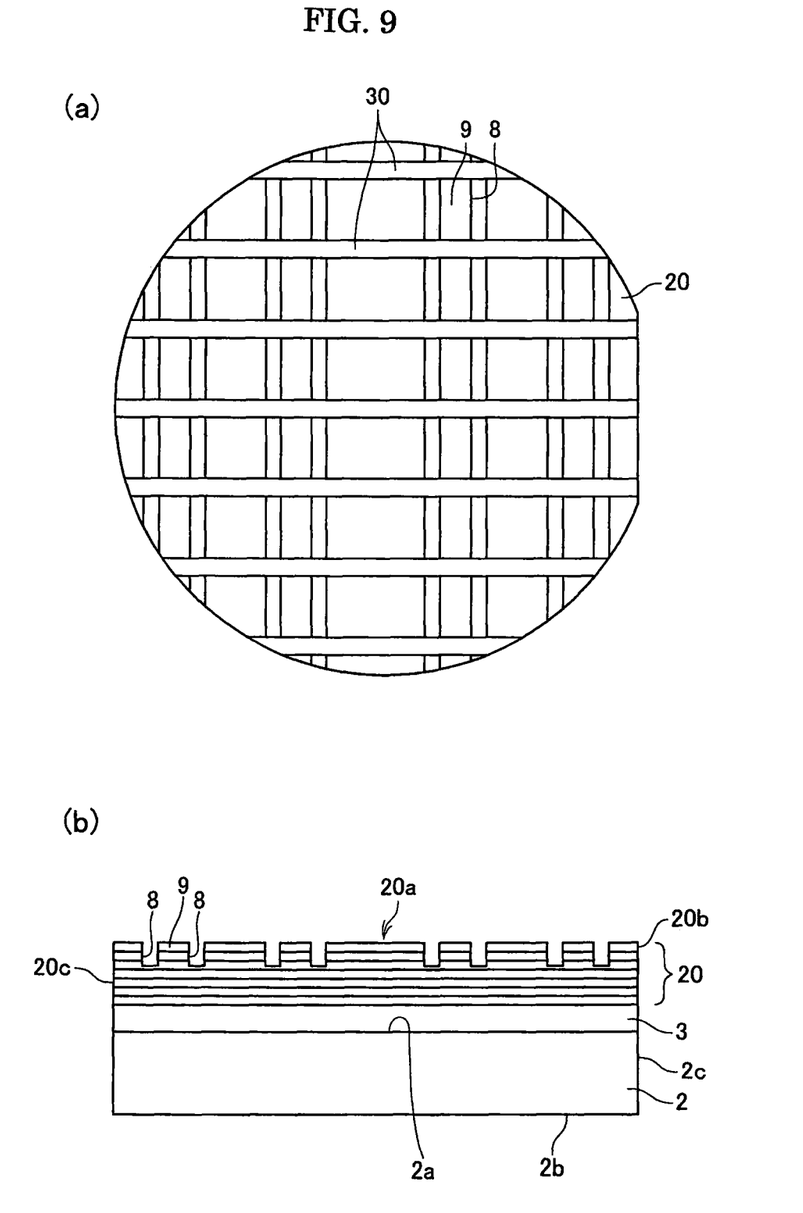
FIG. 9(a) is a plan view showing positions of etching on an end face of each device in a multi-layered film 20 in which the ridge type optical waveguide 9 is formed.
FIG. 9(b) is a side view showing the state that the ridge type optical waveguide 9 is formed in the multi-layered film.

Then, the mask material layer made of aluminum was formed on the multi-layered film, and grooves 30 were formed in the multi-layered film by photolithography (FIG. 9). That is, the grooves 30 each having a depth of 2.4 μm were formed in the multi-layered film by fluorine gas-based etching to leave the optical material film 5 having a thickness of 0.1 μm. In the case that the precision of the processing is low, the depth of the grooves may be processed to a depth as small as 2.3 μm.

Figure 10:
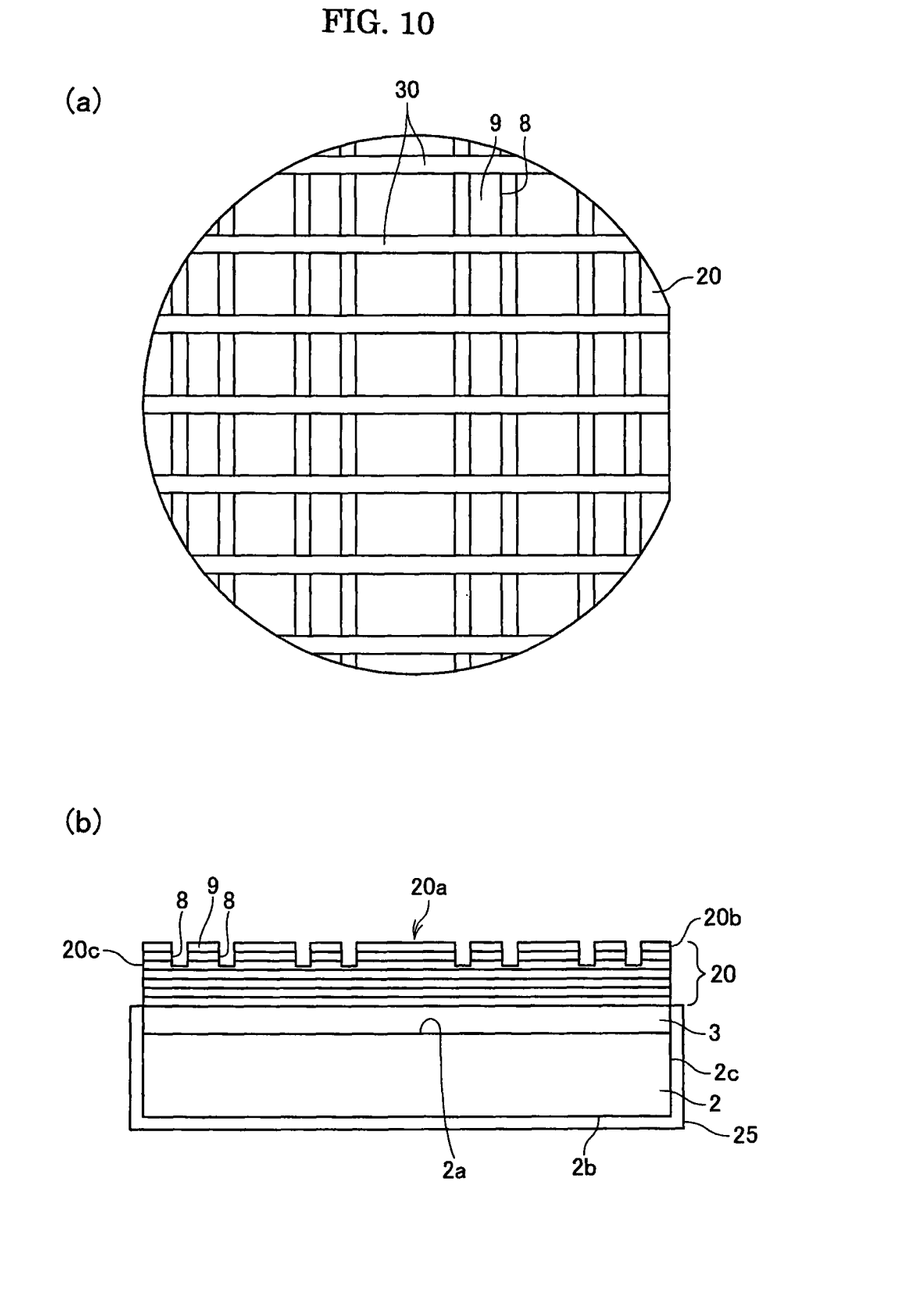
FIG. 10(a) is a plan view showing positions on an end face of each device in the multi-layered film 20 in which the ridge type optical waveguide 9 is formed.
FIG. 10(b) is a side view showing the state that the ridge type optical waveguide 9 is formed in the multi-layered film 20 and the supporting body 2 and clad layer 3 are covered with a protective film.

Thereafter, a protective film 25 of Mo having a thickness of 200 μm was formed on the bottom and side faces of the supporting body 2 to obtain the state shown in FIG. 10. Thereafter, it was wet etched for 13 seconds in fluoric acid (concentration of 50 percent) to form the unevenness on the respective end faces of each multi-layered film. It was proved that the supporting body and clad layer were not etched.

Further, the observation of the respective end faces revealed that the optical material film 6 formed under the low assist condition was recessed by 160 nm, the optical material layer 5 formed under the high assist condition was recessed by 9 nm and the step height "d" of them was proved to be 151 nm.

The adjacent multi-layered films were then cut along the grooves into chips. The end faces of the ppchips were polished to obtain the respective optical waveguide substrates.

The optical characteristics were then evaluated according to the same procedure as Example 1. The coupling efficiency was evaluated by irradiating the light of a wavelength of 633 nm and proved to be 68 percent.

Comparative Example 3

The optical waveguide substrate was produced according to the same procedure as the Example 2. However, the step of etching the end faces of the multi-layered film by fluoric acid was not performed. The coupling efficiency was evaluated by irradiating the light of a wavelength of 633 nm and proved to be 61 percent.

What is claimed is:

1. A method of producing an optical waveguide substrate comprising the steps of:
providing a multi-layered film comprising a plurality of optical material films formed on a supporting body;
providing a plurality of chips in said multi-layered film, each chip comprising an optical waveguide having an end face into which a light is incident on or from which the light is emitted;
providing a groove in said multi-layered film such that the end faces of the chips are exposed to the groove; and
etching said end faces of said chips to provide an unevenness on each of said end faces of said chips, said unevenness corresponding to a difference in etching rates of said optical material films, wherein said optical material films consist of the same substance and the difference in the etching rates of said optical material films is provided by a difference in production conditions thereof.

2. The method of claim 1, further comprising the step of cutting said supporting body corresponding to said chips to obtain a plurality of said optical waveguide substrates, after said end faces are etched.

3. The method of claim 2, further comprising the step of providing a clad layer over said supporting body, wherein said multi-layered film is provided over said clad layer; and wherein said supporting body and said clad layer are cut corresponding to said chips after said end faces are etched.

4. The method of claim 1, further comprising the step of etching a surface of said multi-layered film to provide ridge grooves with an optical waveguide provided between said ridge grooves.

5. The method of claim 3, wherein said supporting body and said clad layer are covered with a protective film in etching said multi-layered film.

6. The method of claim 1, wherein said optical material films are formed by an ion-assisted vapor deposition process and the difference in said production conditions comprise a difference in ion assist conditions during ion-assisted vapor deposition of said optical material films.

7. The method of claim 6, wherein the difference in ion assist conditions comprises differences in beam currents and beam voltages of an ion source during said ion assisted vapor deposition.

8. A method of producing an optical waveguide substrate comprising the steps of:

providing a multi-layered film comprising a plurality of optical material films formed on a supporting body;

providing a plurality of chips in said multi-layered film, each chip comprising an optical waveguide having an end face into which a light is incident on or from which the light is emitted;

providing a groove in said multi-layered film such that the end faces of the chips are exposed to the groove; and etching said end faces of said chips to provide an unevenness on each of said end faces of said chips, said unevenness corresponding to a difference in etching rates of said optical material films, wherein said optical material films consist of the same substance and are formed by an ion-assisted vapor deposition process and the difference in the etching rates of said optical material films is provided by controlling ion assist conditions of said optical material films.

9. The method of claim 8, wherein said ion assist conditions are controlled such that there are differences in beam current and beam voltages during said ion-assisted vapor deposition process.

10. The method of claim 8, further comprising the step of cutting said supporting body corresponding to said chips to obtain a plurality of said optical waveguide substrates, after said end faces are etched.

11. The method of claim 10, further comprising the step of providing a clad layer over said supporting body, wherein said multi-layered film is provided over said clad layer and said supporting body and said clad layer are cut corresponding to said chips after said end faces are etched.

12. The method of claim 8, further comprising the step of etching a surface of said multi-layered film to provide ridge grooves with an optical waveguide provided between said ridge grooves.

13. The method of claim 11, wherein said supporting body and said clad layer are covered with a protective film in etching said multi-layered film.

* * * * *